United States Patent
Jones et al.

(10) Patent No.: US 11,938,880 B2
(45) Date of Patent: Mar. 26, 2024

(54) LOW IMPACT CRASH DETECTION FOR A VEHICLE

(71) Applicant: Robert Bosch GmbH, Stuttgart (DE)

(72) Inventors: Robert Jones, Detroit, MI (US); Michael Vincent Masserant, Farmington Hills, MI (US); Rameez Ahmad, Canton, MI (US); Ulrich Christian Michelfeit, Novi, MI (US); Dean Eiger, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 17/287,085

(22) PCT Filed: Oct. 31, 2019

(86) PCT No.: PCT/EP2019/079863
§ 371 (c)(1),
(2) Date: Apr. 20, 2021

(87) PCT Pub. No.: WO2020/089410
PCT Pub. Date: May 7, 2020

(65) Prior Publication Data
US 2021/0380059 A1    Dec. 9, 2021

Related U.S. Application Data

(60) Provisional application No. 62/808,149, filed on Feb. 20, 2019, provisional application No. 62/754,299, filed on Nov. 1, 2018.

(51) Int. Cl.
*H04N 5/44* (2011.01)
*B60R 21/0136* (2006.01)
(Continued)

(52) U.S. Cl.
CPC ......... *B60R 21/0136* (2013.01); *B60W 30/08* (2013.01); *B60W 50/14* (2013.01);
(Continued)

(58) Field of Classification Search
CPC .... B60R 21/0136; B60R 21/01; B60W 30/08; B60W 50/14; B60W 60/00186;
(Continued)

(56) References Cited

U.S. PATENT DOCUMENTS

| 4,243,248 A | 1/1981 | Scholz et al. |
| 4,900,880 A | 2/1990 | Breed |

(Continued)

FOREIGN PATENT DOCUMENTS

| CN | 101267966 A | 9/2008 |
| CN | 107848478 A | 3/2018 |

(Continued)

OTHER PUBLICATIONS

Translation of Chinese Patent Office Action for Application No. 201980072544.X dated Sep. 15, 2022 (15 pages).
(Continued)

*Primary Examiner* — Munear T Akki
(74) *Attorney, Agent, or Firm* — Michael Best & Friedrich LLP

(57) ABSTRACT

Systems and methods for detecting low impact collisions for a vehicle (100). The system includes at least one sensor (99, 110, 111, 115, 120-123, 125-136, 140, 141) and an electronic controller (150). The electronic controller (150) is configured to receive sensor data from the sensor (99, 110, 111, 115, 120-123, 125-136, 140, 141) and determine one or more features of the sensor data received from the at least one sensor. The electronic controller (150) is further configured to determine if a collision has occurred based upon the one or more features of the sensor data, and take at least (Continued)

one action in response to determining that the collision has occurred.

18 Claims, 18 Drawing Sheets

(51) Int. Cl.
| | |
|---|---|
| *B60W 30/08* | (2012.01) |
| *B60W 50/14* | (2020.01) |
| *B60W 60/00* | (2020.01) |
| *G06N 3/02* | (2006.01) |
| *B60W 50/00* | (2006.01) |

(52) U.S. Cl.
CPC ......... *B60W 60/00186* (2020.02); *G06N 3/02* (2013.01); *B60W 2030/082* (2013.01); *B60W 2050/0057* (2013.01); *B60W 2050/146* (2013.01); *B60W 2420/54* (2013.01); *B60W 2556/45* (2020.02)

(58) Field of Classification Search
CPC ... B60W 2030/082; B60W 2050/0057; B60W 2050/146; B60W 2420/54; B60W 2556/45; B60W 2756/10; G06N 3/02
See application file for complete search history.

(56) References Cited

U.S. PATENT DOCUMENTS

| | | | |
|---|---|---|---|
| 4,995,639 A | 2/1991 | Breed | |
| 5,153,393 A | 10/1992 | Breed et al. | |
| 5,194,755 A | 3/1993 | Rhee et al. | |
| 5,237,134 A | 8/1993 | Thuen et al. | |
| 5,355,716 A | 10/1994 | Castelli | |
| 5,440,913 A | 8/1995 | Crispin et al. | |
| 5,544,716 A | 8/1996 | White | |
| 5,547,149 A | 8/1996 | Kalberer et al. | |
| 5,574,427 A | 11/1996 | Cavallaro | |
| 5,608,270 A | 3/1997 | Meister | |
| 5,610,817 A | 3/1997 | Mahon et al. | |
| 5,668,723 A | 9/1997 | Blackburn | |
| 5,984,350 A | 11/1999 | Hagan et al. | |
| RE36,427 E | 12/1999 | Gioutos | |
| 6,009,970 A | 1/2000 | Breed | |
| 6,012,008 A | 1/2000 | Scully | |
| 9,418,301 B2 | 8/2016 | Ghannam et al. | |
| 9,457,754 B1 | 10/2016 | Christensen et al. | |
| 9,457,763 B2 | 10/2016 | Takenaka | |
| 9,616,836 B2 | 4/2017 | Le et al. | |
| 10,042,359 B1 | 8/2018 | Konrady et al. | |
| 10,997,800 B1 * | 5/2021 | Salodkar ............. | G07C 5/0808 |
| 2002/0063008 A1 | 5/2002 | Spies | |
| 2002/0107649 A1 * | 8/2002 | Takiguchi ............ | A61B 5/1038 |
| | | | 704/E17.002 |
| 2007/0008819 A1 * | 1/2007 | Diessner ............. | G01S 7/52004 |
| | | | 367/99 |
| 2018/0077538 A1 | 3/2018 | Matus et al. | |
| 2018/0102001 A1 | 4/2018 | Faut et al. | |
| 2018/0123937 A1 | 5/2018 | Kent et al. | |
| 2019/0064811 A1 * | 2/2019 | Du ......................... | G01S 7/40 |

FOREIGN PATENT DOCUMENTS

| | | |
|---|---|---|
| DE | 102015212923 A1 | 1/2017 |
| EP | 0305654 A2 | 3/1989 |
| EP | 0402027 A1 | 12/1990 |
| EP | 0567900 A1 | 11/1993 |
| JP | 2008221906 A * | 9/2008 |
| WO | 9919175 A1 | 4/1999 |

OTHER PUBLICATIONS

International Search Report and Written Opinion for Application No. PCT/EP2019/079863 dated Feb. 5, 2020 (13 pages).

* cited by examiner

- SATELLITE ACCELERATION / PRESSURE ~305
- CENTRAL ECU: YAW, PITCH, ROLL, ax, ay, az ~307
- SOUND – AIRBORNE ~310
- BODY SOUND ~311

US 11,938,880 B2

LOW IMPACT CRASH DETECTION FOR A VEHICLE

CROSS REFERENCE TO RELATED APPLICATIONS

This application claims priority to U.S. Provisional Patent Application No. 62/754,299 filed Nov. 1, 2018 and U.S. Provisional Patent Application No. 62/808,149 filed Feb. 20, 2019, the entire contents of which are incorporated by reference in their entirety.

FIELD

Embodiments relate to systems and methods for low impact crash detection for a vehicle.

BACKGROUND

In some countries, such as the United States, drivers are required under penalty of law to report accidents that result in injury or property damage, even if the injury or damage is not severe. Additionally, if the vehicle is an autonomous vehicle, the vehicle must be stopped until the accident is reported and handled by the proper authorities.

Current vehicle passive safety systems (for example, sensors and associated computers or electronic control units) to detect vehicle collisions or other safety hazards) do not have the capability to detect low impact or non-severe accidents, which creates problems for drivers who do not notice the impact or autonomous vehicles equipped with these systems. For example, current crash sensing systems for vehicles can only detect major collisions resulting in a large amount of damage, and not minor collisions (such as a bike running into a vehicle, a bumper of the vehicle gently tapping a road sign, a pedestrian hit by the vehicle, and the like).

SUMMARY

Therefore, a system is provided for detecting low impact crashes for a vehicle (such as a bike running into a vehicle, a bumper of the vehicle gently tapping a road sign, a pedestrian hit by the vehicle, and the like).

One embodiment provides a system for detecting low impact crashes for a vehicle. The system includes at least one sensor, and an electronic controller configured to receive sensor data from the sensor, determine one or more features of the sensor data received from the at least one sensor, determine if a collision has occurred based upon the one or more features of the sensor data, and take at least one action in response to determining that the collision has occurred.

Another embodiment provides a method for detecting low-impact collisions for a vehicle. The method includes receiving, with an electronic controller, sensor data from at least one sensor and determining, with the electronic controller, one or more features of the sensor data received from the at least one sensor. The method further includes determining, with the electronic controller, if a collision has occurred based upon the one or more features of the sensor data, and taking, with the electronic controller, at least one action in response to determining that the collision has occurred.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

In addition, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, flash memory, an optical storage device, a magnetic storage device, a ROM (Read Only Memory), a RAM (Random Access Memory), register memory, a processor cache, or any combination thereof.

Figure 1:
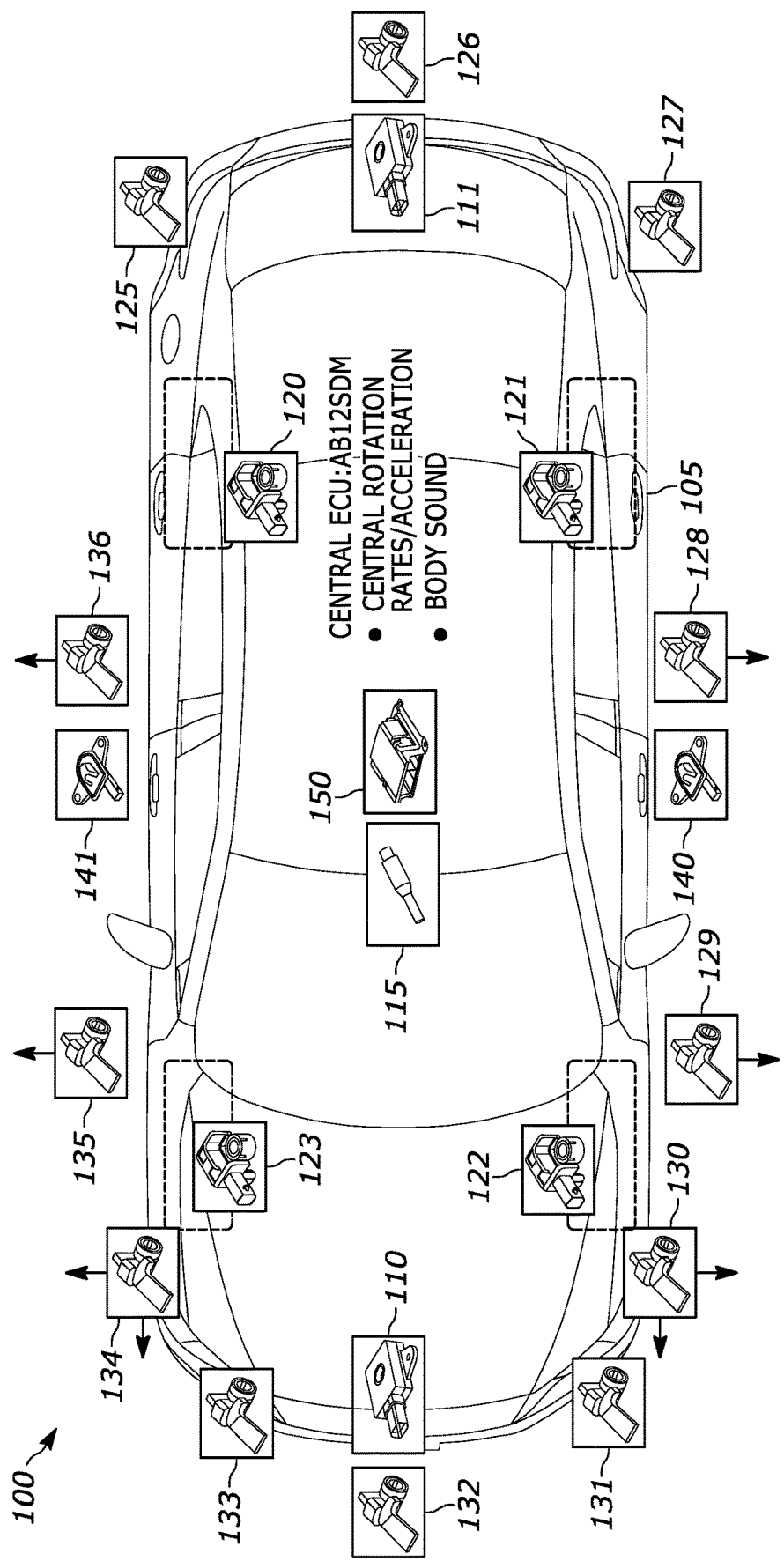
FIG. 1 illustrates a system for detecting low impact crashes for a vehicle according to one embodiment.

FIG. 1 illustrates a system 100 for detecting low impact crashes for a vehicle 105 according to one embodiment. The system 100 includes one or more exterior microphones 110 and 111, an interior microphone 115, one or more road noise sensors 120-123, one or more acceleration sensors 125-136, and one or more pressure sensors 140 and 141.

The vehicle 105 may be an automobile, motorcycle, tractor-trailer, truck, van, and the like. The exemplary embodiment of the vehicle 105 shown in FIG. 1 includes four wheels. However, other embodiments of the vehicle 105 may include less wheels (for example, a motorcycle on two wheels) or more wheels (such as a tractor-trailer with multiple wheels per axle).

The one or more exterior microphones 110 and 111 are configured to gather audio data outside the vehicle 105, for example, airborne or body sounds. For example, the one or more exterior microphones 110 and 111 gather audio data of objects impacting the vehicle 105. The one or more exterior microphones 110 and 111 are located, for example, at a license plate area on a front portion of the vehicle 105 and at a second license plate area located on a rear portion of the vehicle 105.

The interior microphone 115 is configured to gather audio data inside the vehicle 105. For example, the interior microphone 115 gathers audio data inside the vehicle 105 as an object strikes the vehicle 105. The interior microphone 115 is located, for example, on a rearview mirror inside the vehicle 105.

The one or more road noise sensors 120-123 are configured to utilize an accelerometer to gather low g-force data introduced by a driving surface that the vehicle 105 is driving on into the body of the vehicle 105 via wheels of the vehicle 105. For example, the road noise sensors 120-123 are located on or near axles of the vehicle 105 and detect low g-force data of the wheels of the vehicle 105 contacting the driving surface or other driving obstacles on the driving surface (such as speed bumps, debris, and the like).

The one or more acceleration sensors 125-136 may be, for example, an inertial sensor configured to measure acceleration in one or more axes of movement. The one or more acceleration sensors 125-136 may also include a gyroscope to measure angular velocity. The one or more acceleration sensors 125-136 measure an acceleration and/or angular velocity of the vehicle 105 or portions of the vehicle 105 (such as a side panel, a bumper, and the like) that occur in response to a collision with an object. The one or more acceleration sensors 125-136 may be configured to detect low g-force accelerations, such as impacts of 2 to 16 kilometers per hour (for example, a pedestrian colliding with a side of the vehicle 105). In some embodiments, the one or more acceleration sensors 125-136 may include a variety of sensors configured to detect different levels of g-force from impacts. In one example, the sensors are configured to detect low g-force impacts (such as the ones described above) and mid g-force impacts. Mid g-force impacts may results from objects traveling above 16 kilometers per hour colliding with the vehicle (for example, a motorcycle colliding with a side of the vehicle 105). In one instance, the 6D cluster sensors are used to detect mid g-force impacts.

The one or more pressure sensors 140 and 141 are configured to detect pressure being applied on portions of the vehicle 105. For example, the one or more pressure sensors 140 and 141 may be located on side doors of the vehicle 105 and configured to measure pressure applied to the side doors of the vehicle.

It is to be understood that the one or more exterior microphones 110 and 111, the interior microphone 115, the one or more road noise sensors 120-123, the one or more acceleration sensors 125-136, and the one or more pressure sensors 140 and 141 may be located at or on any portion of the vehicle 105, and that the locations of each provided in FIG. 1 are part of an exemplary embodiment of the system 100.

Figure 2:
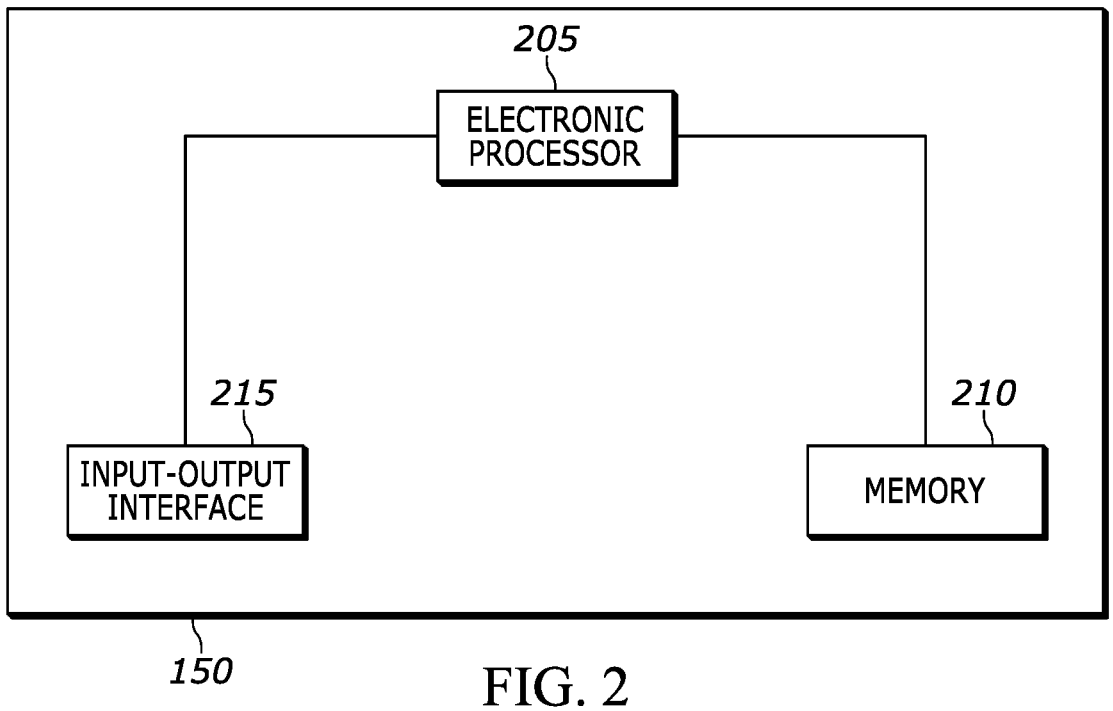
FIG. 2 illustrates an electronic controller according to one embodiment.

The one or more exterior microphones 110 and 111, the interior microphone 115, the one or more road noise sensors 120-123, the one or more acceleration sensors 125-136, and the one or more pressure sensors 140 and 141 are electrically connected to an electronic controller 150 and are configured to send data to the electronic controller 150. An embodiment of the electronic controller 150 is illustrated in FIG. 2.

The electronic controller 150 includes a plurality of electrical and electronic components that provide power, operation control, and protection to the components and modules within the electronic controller 150. In the example illustrated, the electronic controller 150 includes an electronic processor 205 (such as a programmable electronic microprocessor, microcontroller, or similar device), a memory 210 (for example, non-transitory, computer-readable memory), and an input-output interface 215. The electronic processor 205 is communicatively connected to the memory 210 and the input-output interface 215. The electronic processor 205, in coordination with software stored in the memory 210 and the input-output interface 215, is configured to implement, among other things, methods described herein.

The electronic controller 150, in some embodiments, may be implemented in several independent controllers (for example, programmable electronic control units) each configured to perform specific functions or sub-functions. Additionally, the electronic controller 130 may contain sub-modules that include additional electronic processors, memory, or application-specific integrated circuits (ASICs) for handling input-output functions, processing of signals, and application of the methods listed below. In other embodiments, the electronic controller 130 includes additional, fewer, or different components.

Figure 3:
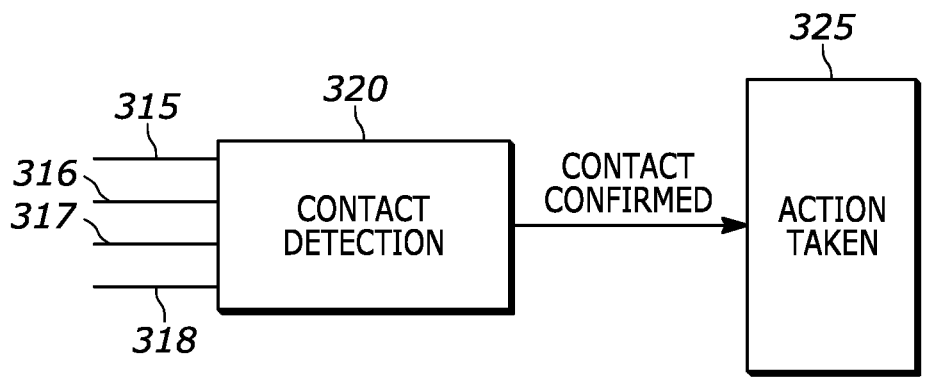
FIG. 3 is a block diagram illustrating software logic according to one embodiment.

The electronic controller 150 may also include an integrated 6D sensor cluster 220. The integrated 6D sensor cluster 220 includes, in one embodiment, a 3D acceleration sensor, a 3D gyroscope, and a central 2D body sound sensor. The central 2D body sound sensor detects accelerations introduced into a body of the vehicle 105 by different forces (such as doors opening and closing, from a driving surface FIG. 3 is a block diagram illustrating a portion of software logic 300 for the system 100 according to one embodiment. The electronic controller 150 receives sensor data 305 from a sensor (for example, the one or more acceleration sensors 125-136 or the one or more pressure sensors 140 and 141), one or more vehicle parameters 307 received from a stand-alone sensor cluster or integrated in the electronic controller 150 (such as yaw, pitch, roll, acceleration in x, y, z axis), and audio data 310 and 311 from the one or more exterior microphones 110 and 111 (audio data 310) and the interior microphone 115 (audio data 311). The electronic controller 150 uses these four inputs 315-318 to perform contact detection using contact detection software 320 as described below. If contact is detected based upon the four inputs 315-318, the electronic controller 150 is configured to take at least one action (at 325).

The electronic controller 150 may also include extra plausibility step software. The extra plausibility step software includes instructions to process the sensor data 305, vehicle parameters 307, and audio data 310 and 311 to remove outlier data or perform an initial comparison of the sensor data 305, vehicle parameters 307, and/or audio data 310 and 311 to known collision data characteristics, or otherwise process the sensor data 305, the vehicle parameters 307, and the audio data 310 and 311. For example, the electronic controller 150 may receive data from the one or more acceleration sensors 125-136 indicating an acceleration indicative of a collision, but the one or more road sensors 120-123 may help filter out the acceleration as noise from a pothole or a rough road, which would not be considered a low-impact collision causing injury or damage. In another embodiment, the one or more acceleration sensors 125-136 may detect a door slam as an acceleration, but the electronic controller 150 may receive data from a secondary electronic controller indicating a door was shut (for example, receiving a data flag from the secondary electronic controller indicating a Boolean value for door open, for example, 0 being false and 1 being true), and filter the detected sound out as a door slam instead of a collision.

In another embodiment, the one or more acceleration sensors 125-136 may detect a door slam as an acceleration, but the electronic controller 150 may receive data from the secondary electronic controller indicating a proximity of an object to the vehicle (for example, data from an ultrasonic sensor system or video data from a video system including one or more cameras mounted on the vehicle 105). Based upon the proximity of the object, the electronic controller 150 is configured to increase or decrease a sensitivity of the contact detection software 320. For example, if the electronic controller 150 determines that a second vehicle is in close proximity to the vehicle 105, the electronic controller 150 will increase sensitivity by not filtering out a door slam (during, for example, operation of the extra plausibility step software). In this case, the door slam may be a door of the vehicle 105 impacting the second vehicle, which is a low-impact collision. In contrast, if no object is in close proximity to the vehicle 105, the electronic controller 150 may decrease the sensitivity of the contact detection software 320 to ignore all sensor data indicative of a door slam, as the sensor data indicating the door slam will only be a door closing on the vehicle 105. It is to be understood that the filtering of a door slam is only an example and that data from other sensors described in this application or from other vehicle systems could be used to increase or decrease the sensitivity of the contact detection software 320.

The contact detection software 320 and the extra plausibility step software may be stored in the memory 210.

Figure 4:
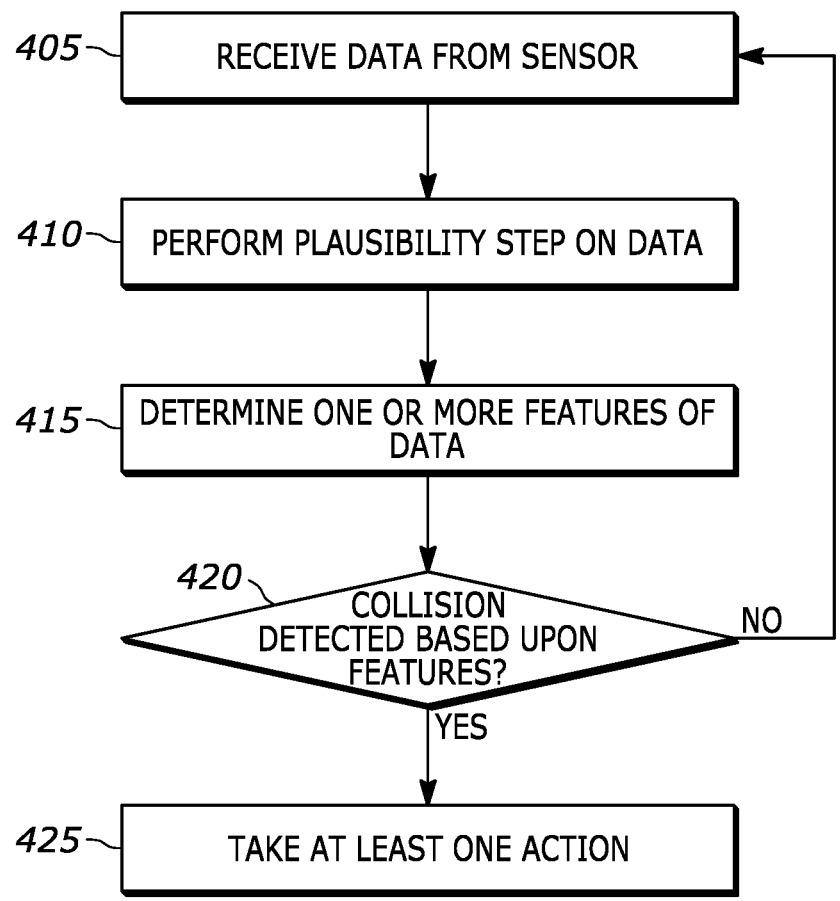
FIG. 4 illustrates a method of detecting low-impact collisions for a vehicle according to one embodiment.

FIG. 4 illustrates a method 400 of detecting low-impact collisions for the vehicle 105 according to one embodiment and implemented, for example, by the contact detection software 320. The method 400 includes receiving, with the electronic controller 150, data from at least one sensor (at block 405). For example, the electronic controller 150 may receive data from the one or more external microphones 110 and 111, the internal microphone 115, the one or more road noise sensors 120-123, the one or more acceleration sensors 125-136, the one or more pressure sensors 140 and 141, or any combination of these.

In some embodiments, audio data from the one or more external microphones 110 and 111 and/or the internal microphone 115 or acceleration data from the one or more road noise sensors 120-123 is used only to validate or filter other sensor data received from a different sensor (as described below with regards to a plausibility step). In other embodiments, any impact detected as an audible noise by the one or more external microphones 110 and 111 and/or the internal microphone 115 is used (either alone or in conjunction with other sensor data) to confirm that a collision has occurred.

The method 400 also includes performing, with the electronic controller 150, a plausibility step on the received sensor data (at block 410). As described above with regards to the extra plausibility step software, the plausibility step is used to filter out unwanted data that could be misinterpreted as a low-impact collision. For example, as discussed above, the vehicle 105 may drive over a rough patch of road, and the one or more acceleration sensors 125-136 may detect an acceleration. When the electronic controller 150 receives this data, instead of immediately using it to determine if a low-impact collision has occurred, the electronic controller 150 utilizes the extra plausibility step software to filter out the noise of the rough patch of road (for example, by using data from the one or more road noise sensors 120-123). In this way, false positives can be avoided.

The method 400 also includes determining, with the electronic controller 150, one or more features of the sensor data (at block 415). For example, the electronic controller 150 may determine an amplitude of the sensor data, determine a signal energy of the sensor data, determine one or more frequencies of the sensor data, perform a Fourier transform on the sensor data to obtain a frequency representation of the signal (as opposed to a time representation of the signal), determine an amount and direction of acceleration, determine an angular rotation, and the like.

In the example provided, the method 400 also includes determining, with the electronic controller 150, if a collision has occurred (at block 420). In order to determine that a collision has occurred, the electronic controller 150 may, in some embodiments, compare the determined features of the sensor data (from block 415) to known characteristics of different impacts. The known characteristics may be data sets stored in the memory 210. For example, an impact by an object at 3 kilometers per hour on a door of the vehicle 105 may have a known amplitude, set of frequencies, amount of acceleration, and the like. If the determined features match the known characteristics of this impact, the electronic controller 150 determines that a collision has occurred.

Figure 5A:
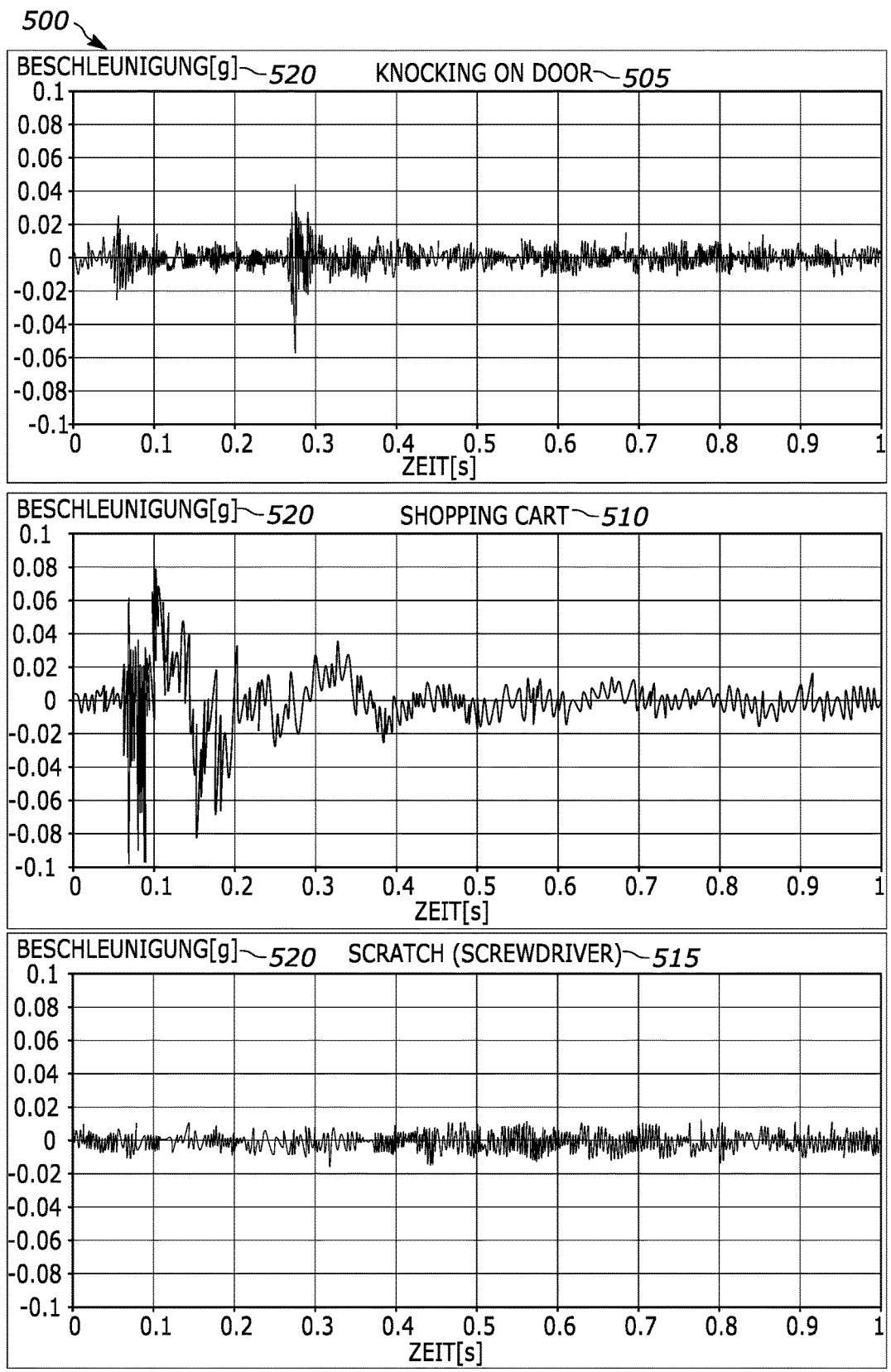
FIG. 5 illustrates characteristics of different low-impact collisions according to one embodiment.
Figure 5B:
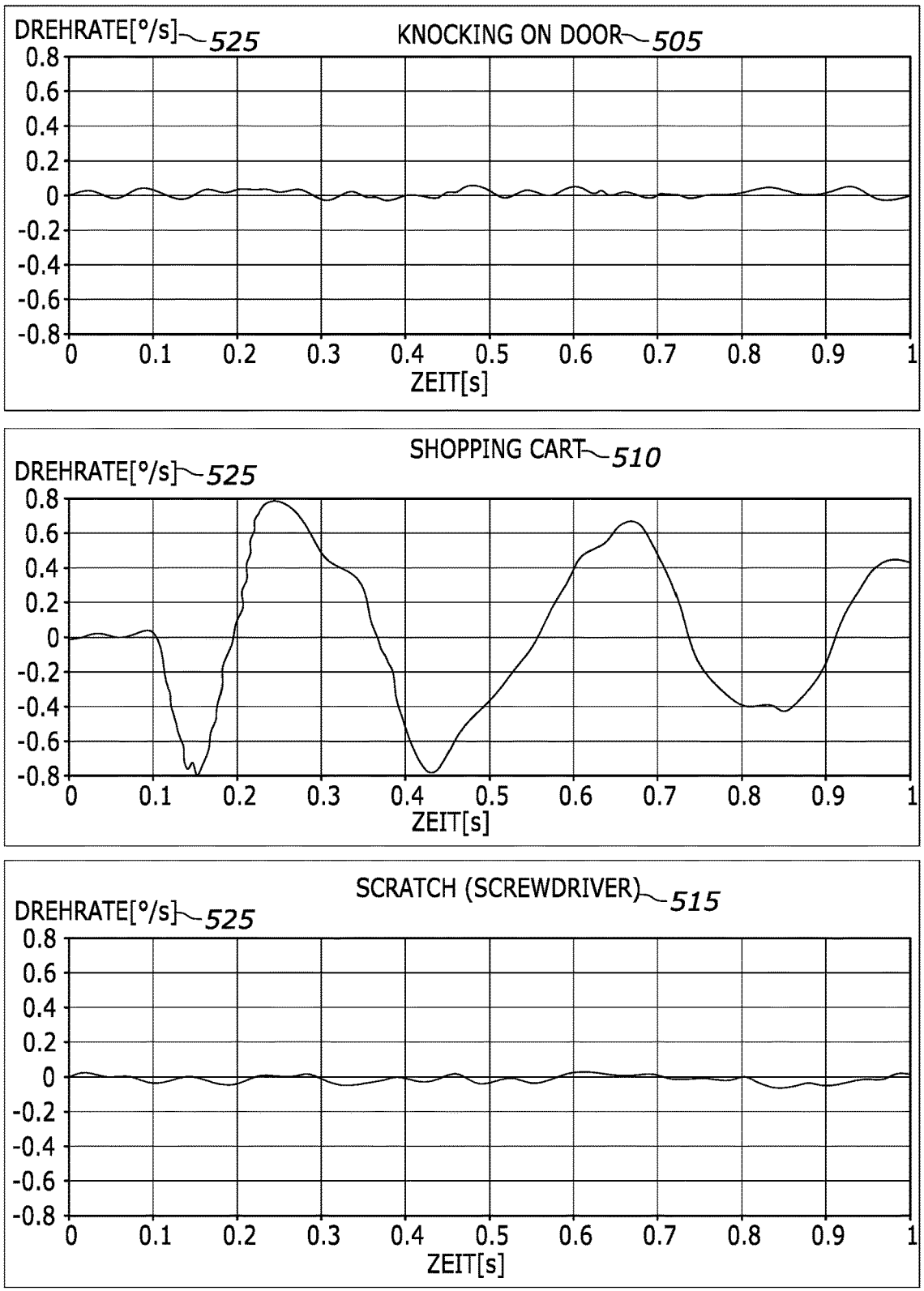
Figure 5C:
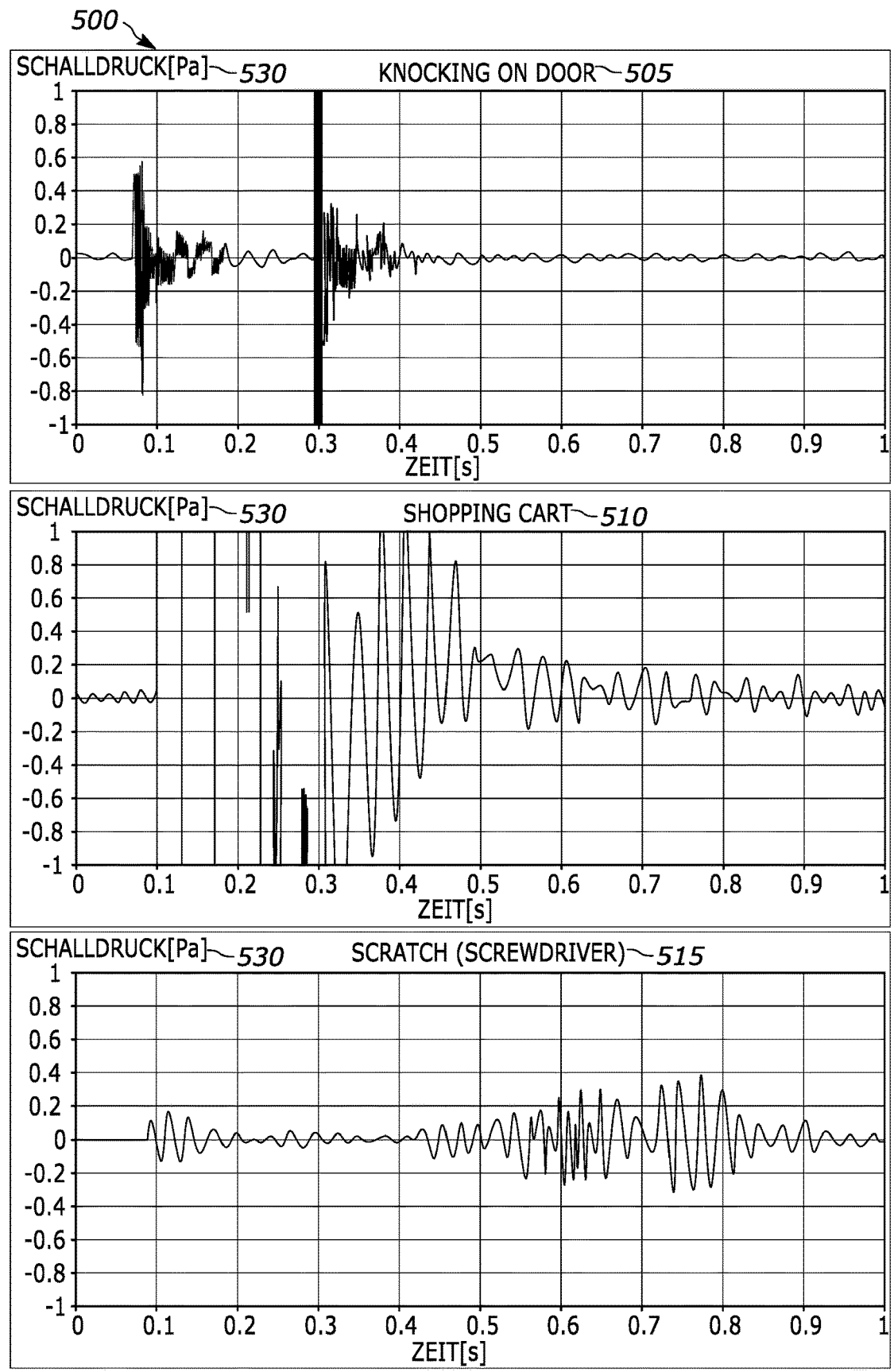

For example, FIG. 5 illustrates characteristics of different low-impact collisions 500 according to one embodiment. Columns 505, 510, and 515 illustrate known low-impact collisions (knocking on a door of the vehicle 105, a shopping cart rolling into the vehicle 105, and a screw driver scratching on a door of the vehicle 105, respectively), while rows 520, 525, and 530 illustrate the characteristics of the known low-impact collisions (acceleration in g-force, rotation rate of a gyroscope, and pressure, respectively). The electronic controller 150 compares the received sensor data to known characteristics and, if the sensor data matches a known low-impact collision to a threshold degree in one or more characteristics, the electronic controller 150 determines that a collision has occurred.

Figure 6:
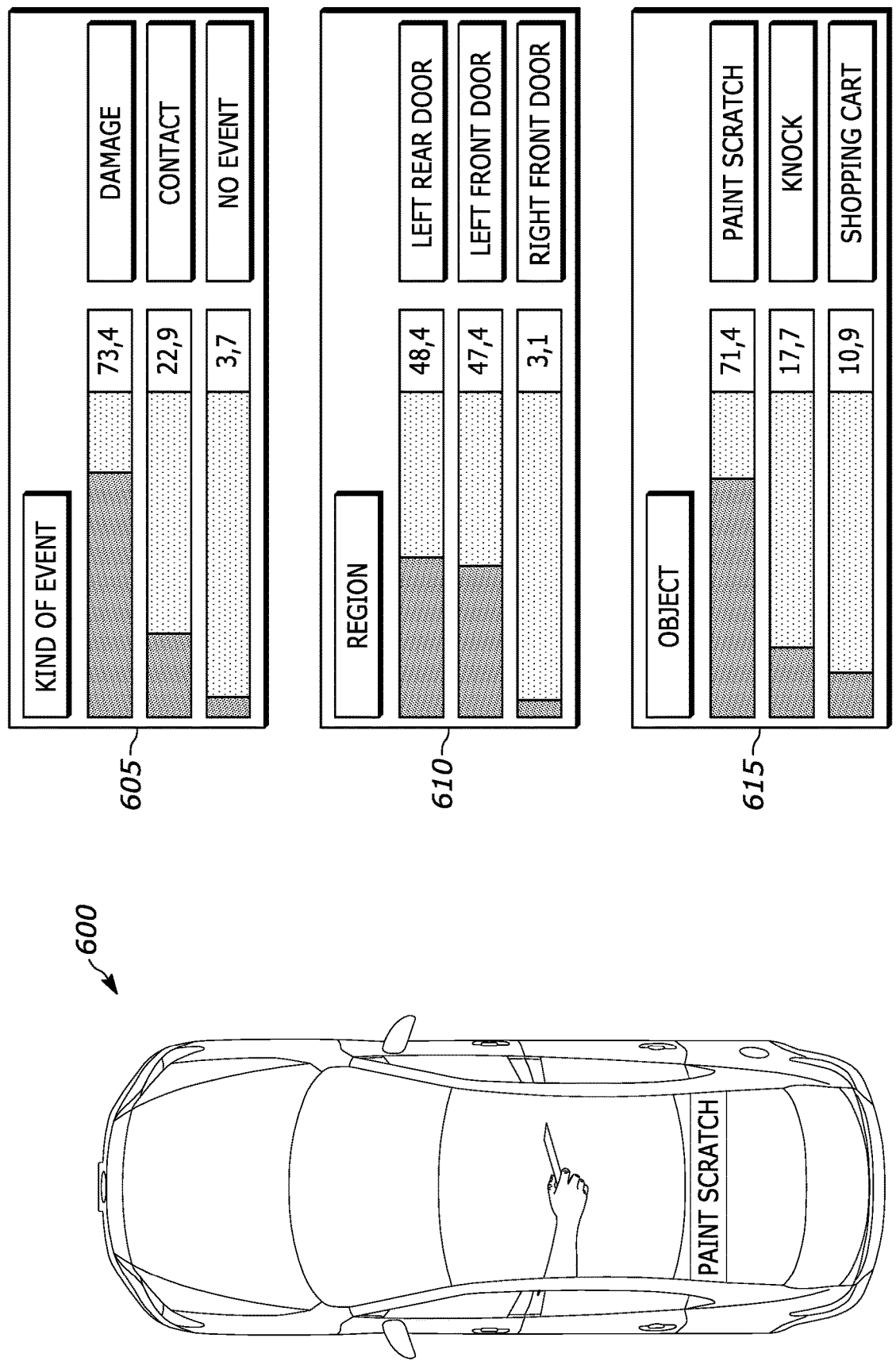
FIG. 6 illustrates an example of a Bayes classifier being used to determine if a collision has occurred.

In other embodiments, the electronic controller 150 may utilize machine learning to determine if a collision has occurred. For example, the electronic controller 150 may utilize a Bayes classifier with a kernel function. A Bayes classifier (or Bayesian classifier) is a type of probabilistic classifier that predicts, given the input (the determined features), a set of probabilities that different events occurred (instead of, for example, outputting the most likely event). The Bayes classifier utilizes Bayes' Theorem with strong independence assumptions of the input features. The kernel function helps focus the Bayes classifier by finding relationships between data points in data sets. The determined features are input into the Bayes classifier and, based upon the kernel function and the input features, the electronic controller 150 outputs a set of probabilities that different events occurred. For example, the electronic controller 150 may output that it is 75 percent likely that damage has occurred, 23 percent likely that contact but no damage has occurred, and 2 percent likely that no contact has occurred based upon the inputs being processed. A Bayes classifier may also be used to determine a location on the vehicle that damage occurred and a type of contact or damage that has occurred. FIG. 6 illustrates an example 600 of a Bayes classifier being used to determine if a collision has occurred (605), a location of the collision (610), and a type of the collision (615).

Alternatively, the electronic controller 150 may use a neural network to determine if a collision has occurred. The neural network is trained by feeding training data containing a number features into the network along with the outcome. The neural network has one or more nodes that process the various input features to determine an outcome, which is compared with the actual outcome to determine accuracy, and then the result of the comparison (for example, correctly identified or incorrectly identified) is back-propagated through the network to correct for any errors in the node calculations. Over iterations of time and with large, varied sets of training data (for example, a large variety of accelerations, sounds, pressures, road noises, and the like), the neural network becomes more accurate in predicting if damage occurs, the location of the damage, and the type of damage that occurs. After the neural network is trained (which may be done based upon factory tests and input into the memory 210 of the electronic controller 150), the electronic controller 150 is configured to determine the features of the sensor data (at block 415) and input the determined features into the neural network to receive an output indicating that damage has or has not occurred.

If the electronic controller 150 determines that damage has not occurred (at block 420), the method 400 returns to waiting to receive sensor data (at block 405). If the electronic controller 150 determines that damage has occurred, the electronic controller 150 takes at least one action in response (at block 425). For example, the electronic controller 150 may be configured to output a signal to a display in the vehicle 105 indicating that damage has occurred (for example, output an indication that damage has occurred). If the collision is severe enough (for example, the acceleration is above a threshold based upon a location), the electronic controller 150 may be configured to store additional data (for example, video data from one or more cameras on the vehicle 105) in the memory 210 or a separate memory, such as an event data recorder memory, located within the electronic controller 150 or in a separate electronic controller.

If the vehicle 105 is an autonomous vehicle, the electronic controller 150 may be configured to transmit a notification of damage to a remote location (such as an insurance company for a claim, to a police department, to a car dealership, to a repair facility, and the like) using a transceiver antenna, or another wireless communication device, send a signal (or a command) to a driving controller to slow the vehicle 105 or stop the vehicle 105, and the like. The electronic controller 150 may also be configured to store any sensor data and associated determinations regarding low-impact collisions in the memory 210 for later access by a technician or other user of the vehicle 105.

Figure 7A:
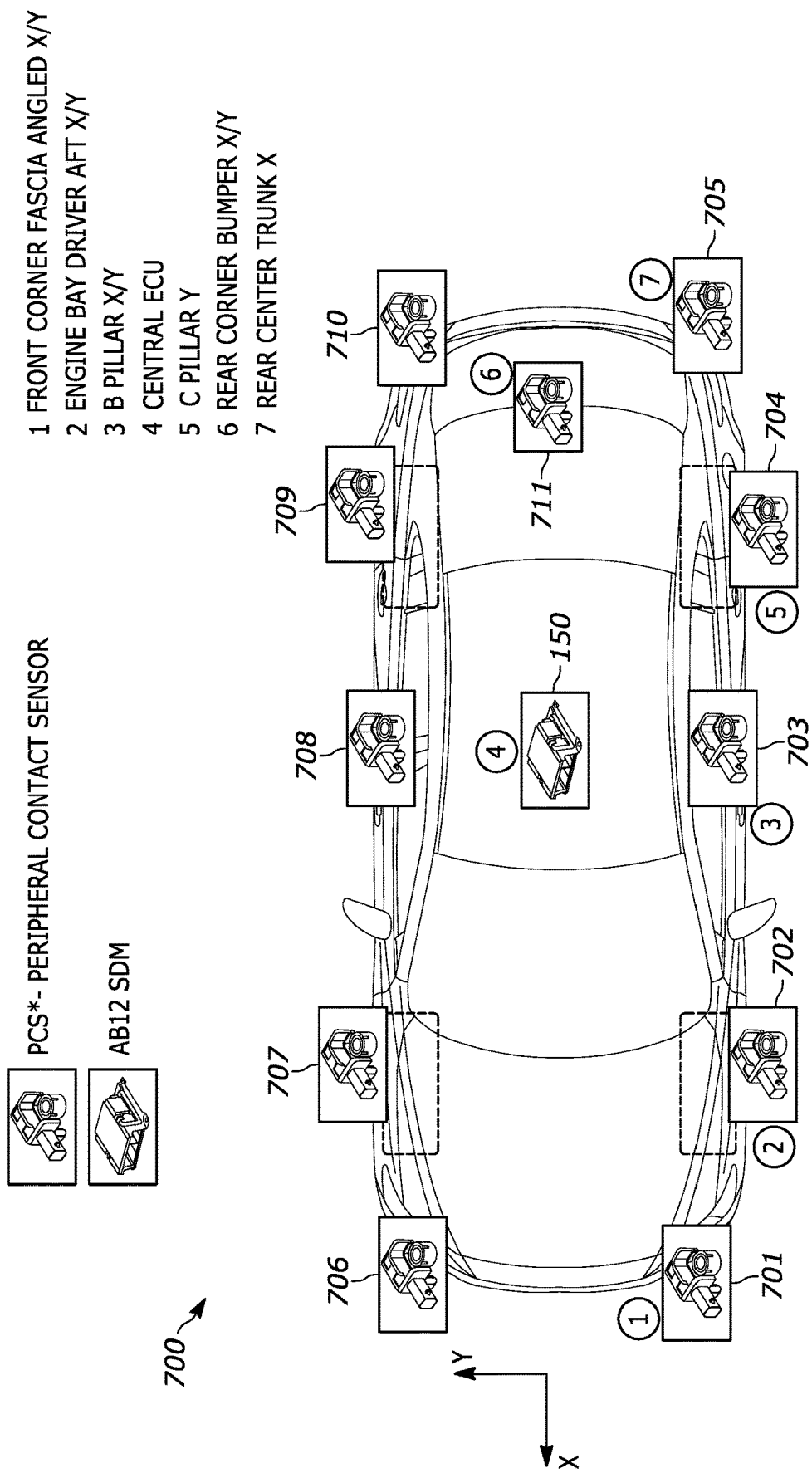
FIG. 7A illustrates a first configuration of sensors according to one embodiment.
Figure 7B:
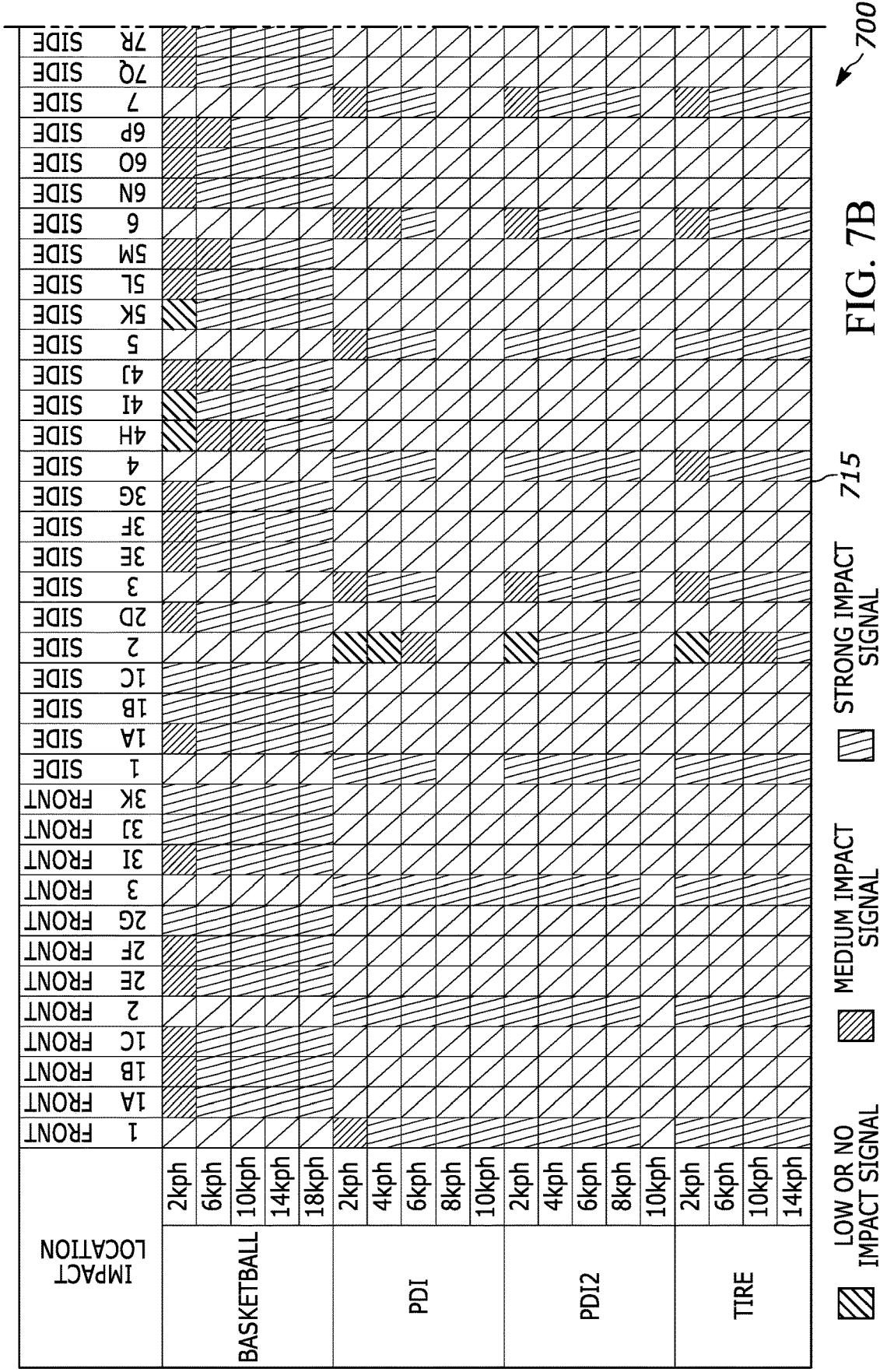
FIG. 7B illustrates a first chart illustrating the detection of impact signals according to one embodiment.
Figure 7C:
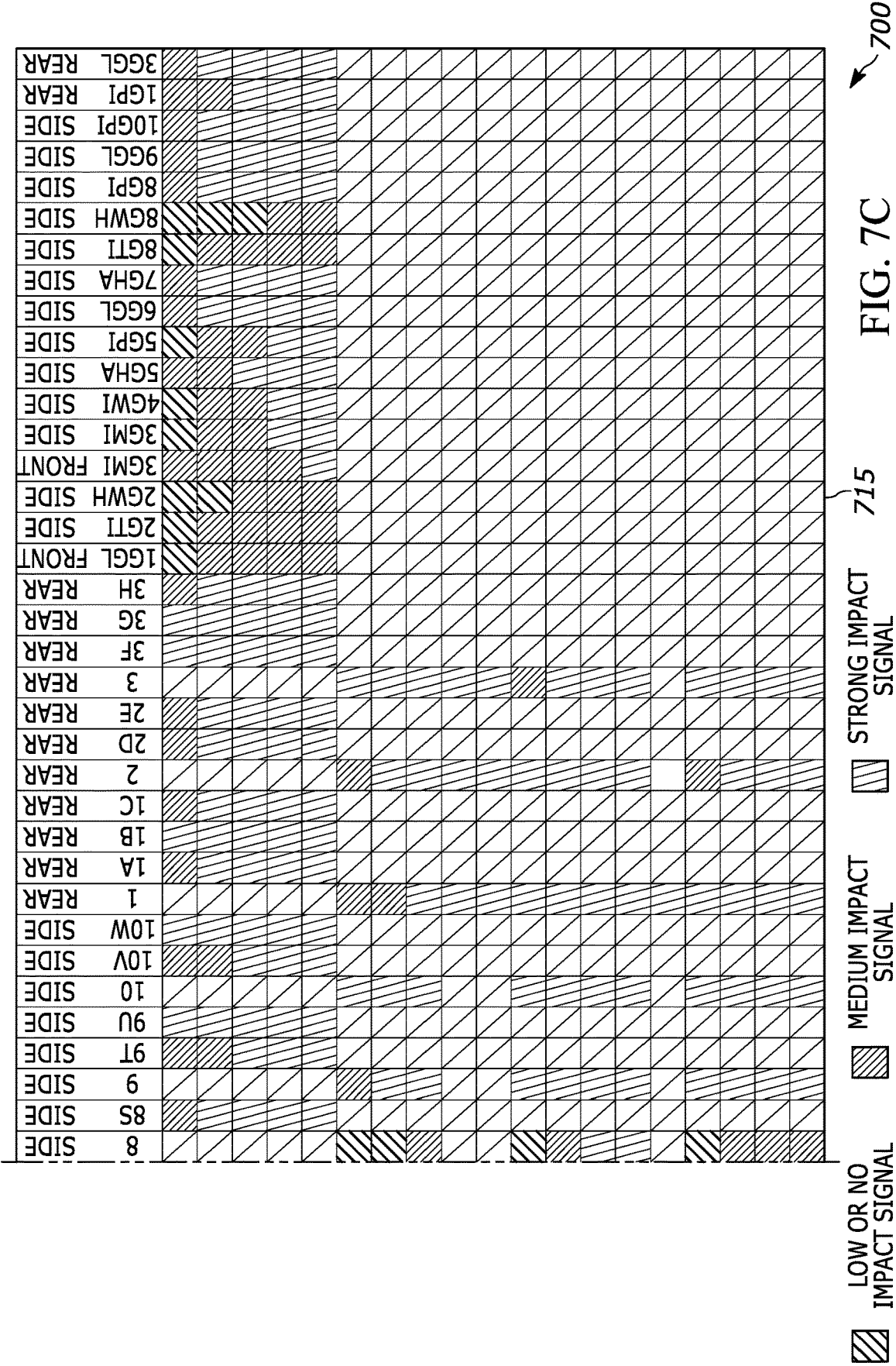
FIG. 7C illustrates a continuation of the first chart according to the embodiment of FIG. 7B.

FIG. 7A illustrates a first sensor configuration 700 according to one embodiment. The first sensor configuration 700 includes the electronic controller 150 and peripheral contact sensors 701-711. Sensors 701 and 706 are located on at the left and right front center fascia of the front bumper of the vehicle 105. Sensors 702 and 707 are located at the left and right sides of the engine bay of the vehicle 105. Sensors 703 and 708 are located at the left and right B pillars of the vehicle 105. Pillars (A-C normally from front to rear of the vehicle 105) are vertical supports for the window areas of the vehicle 105. Sensors 704 and 709 are located at the left and right C pillars of the vehicle 105. Sensors 705 and 710 are located at the left and right rear corners of the rear bumper of the vehicle 105. Sensor 711 is located on the rear trunk of the vehicle 105. This first sensor configuration 700 covers most use cases for detecting low impact collisions. By having sensor coverage at all of the locations of the peripheral contact sensors 701-711, low impacts can be accurately detected at all points of the vehicle 105. For example, first chart 715, as shown in FIG. 7B and FIG. 7C, illustrates how impact signals are detected for different objects (a basketball, crash test dummies, and tire noise) at different impact speeds in different impact locations on the vehicle 105 in the first sensor configuration 700.

Figure 8A:
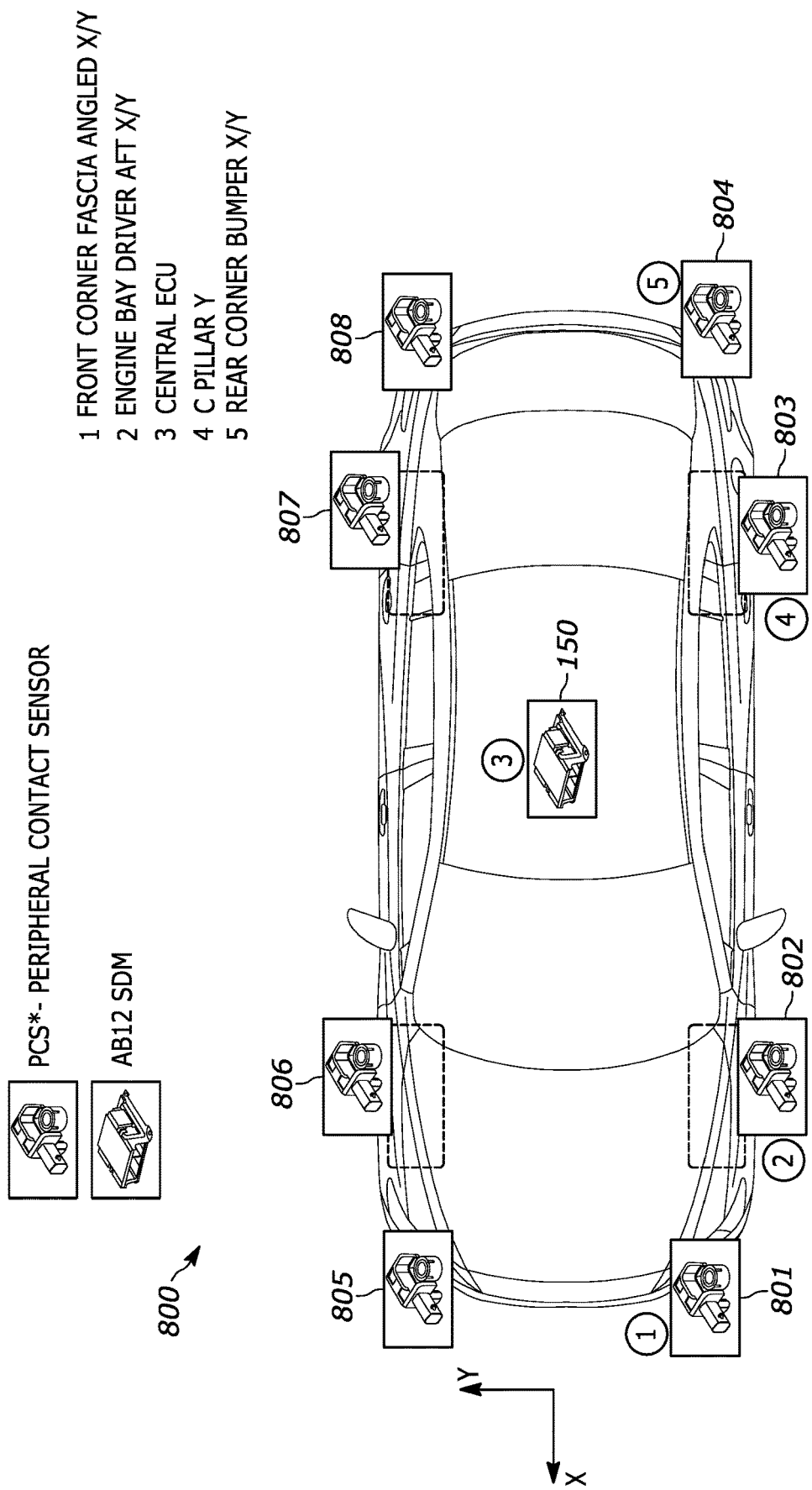
FIG. 8A illustrates a second configuration of sensors according to one embodiment.
Figure 8B:
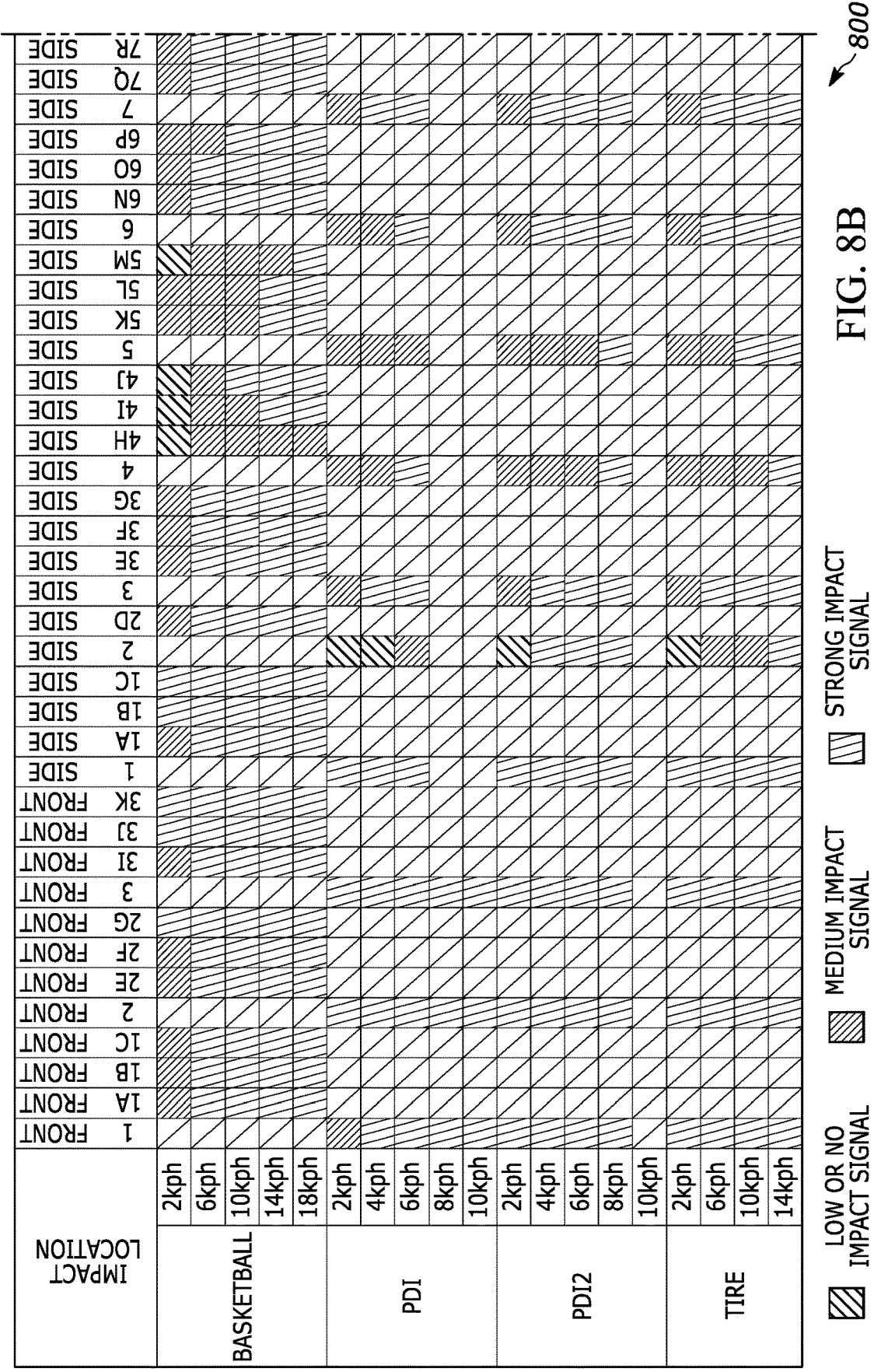
FIG. 8B illustrates a second chart illustrating the detection of impact signals according to one embodiment.
Figure 8C:
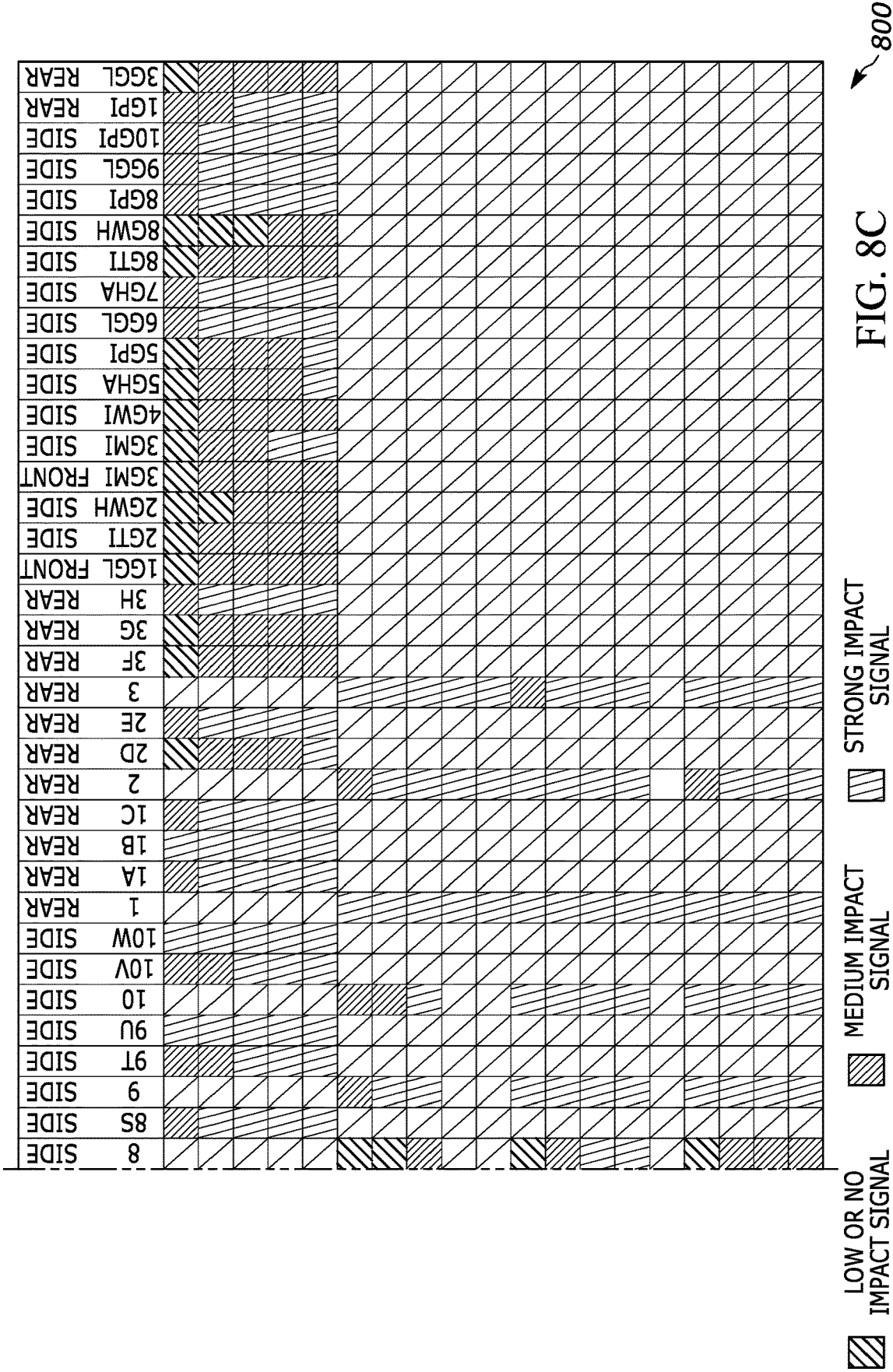
FIG. 8C illustrates a continuation of the second chart according to the embodiment of FIG. 8B.

FIG. 8A illustrates a second sensor configuration 800 according to one embodiment. The second sensor configuration 800 includes the electronic controller 150 and peripheral contact sensors 801-808. Sensors 801 and 805 are located at the left and right front fascia of the front bumper of the vehicle 105. Sensors 802 and 806 are located at the left and right sides of the engine bay of the vehicle 105. Sensors 803 and 807 are located at the left and right C pillars of the vehicle 105. Sensors 804 and 808 are located at the left and right rear corners of the rear bumper of the vehicle 105. In the second sensor configuration, low impact collisions of 6 kilometers per hour are detected to a high degree of accuracy while requiring less sensors than the first sensor configuration 700. For example, a second chart, as shown in FIG. 8B and FIG. 8C, illustrates how impact signals are detected for different objects (a basketball, crash test dummies, and tire noise) at different impact speeds in different impact locations on the vehicle 105 in the second sensor configuration 800.

Figure 9A:
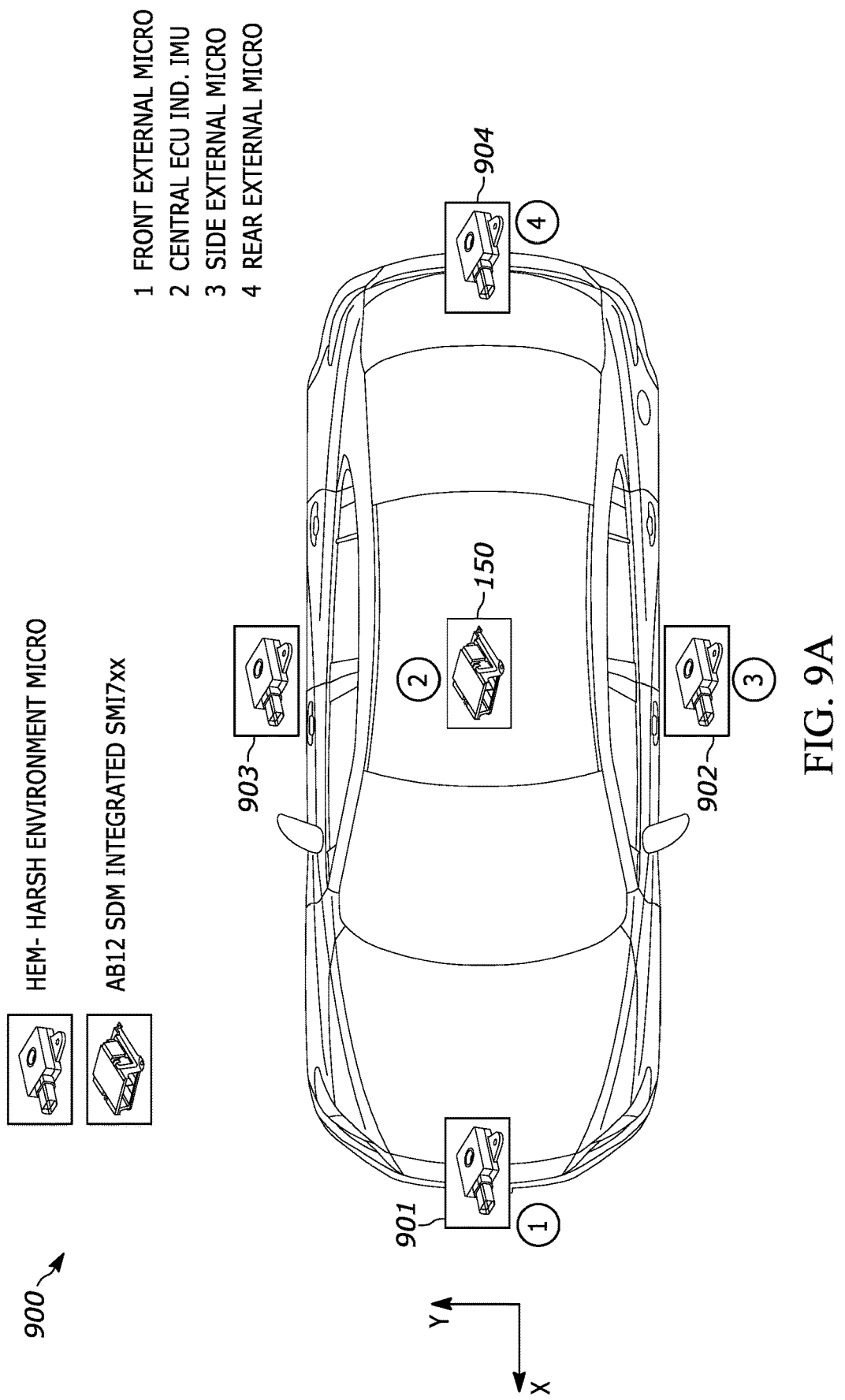
FIG. 9A illustrates a third configuration of sensors according to one embodiment.

FIG. 9A illustrates a third sensor configuration 900 according to one embodiment. The third sensor configuration 900 includes the electronic controller 150 and harsh environment microphones 901-904. Microphone 901 is located on the front bumper of the vehicle 105. Microphones 902 and 903 are located on the left and right sides of the vehicle 105. Microphone 904 is located on the rear bumper of the vehicle 105. The harsh environment microphones

Figure 9B:
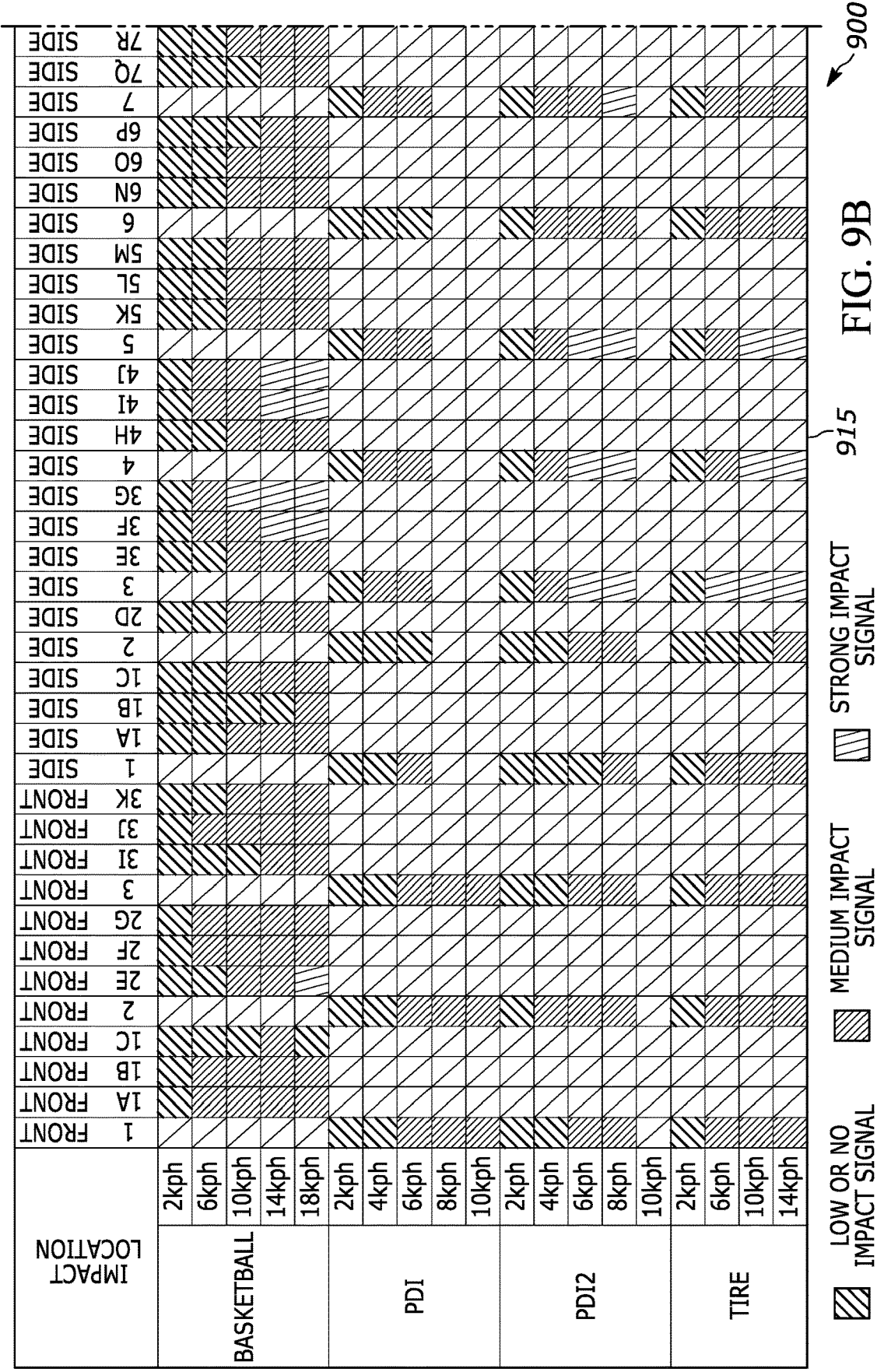
FIG. 9B illustrates a third chart illustrating the detection of impact signals according to one embodiment.
Figure 9C:
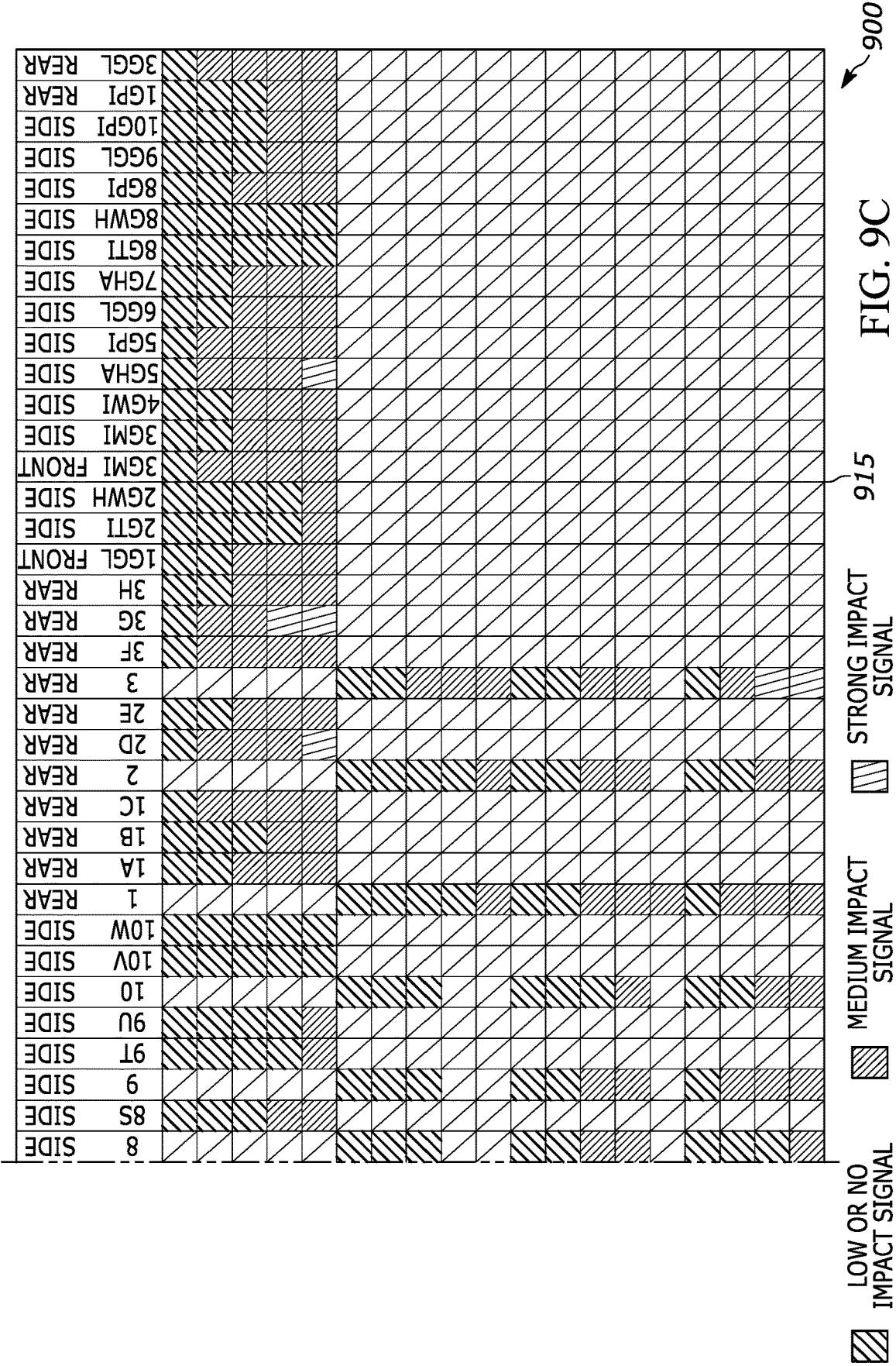
FIG. 9C illustrates a continuation of the third chart according to the embodiment of FIG. 9B.

901-904 detect most of the use cases for low impact collisions, but cannot be used reliably considering audio noise spectrums from external noise, such as road noise. To better judge the external microphone audio data, an artificial intelligence algorithm, such as the above-described machine learning or Bayes classification algorithms, may be used. A third chart, as shown in FIGS. 9B and 9C, illustrates how impact signals are detected for different objects (a basketball, crash test dummies, and tire noise) at different impact speeds in different impact locations on the vehicle 105 in the third sensor configuration 900.

Figure 10:
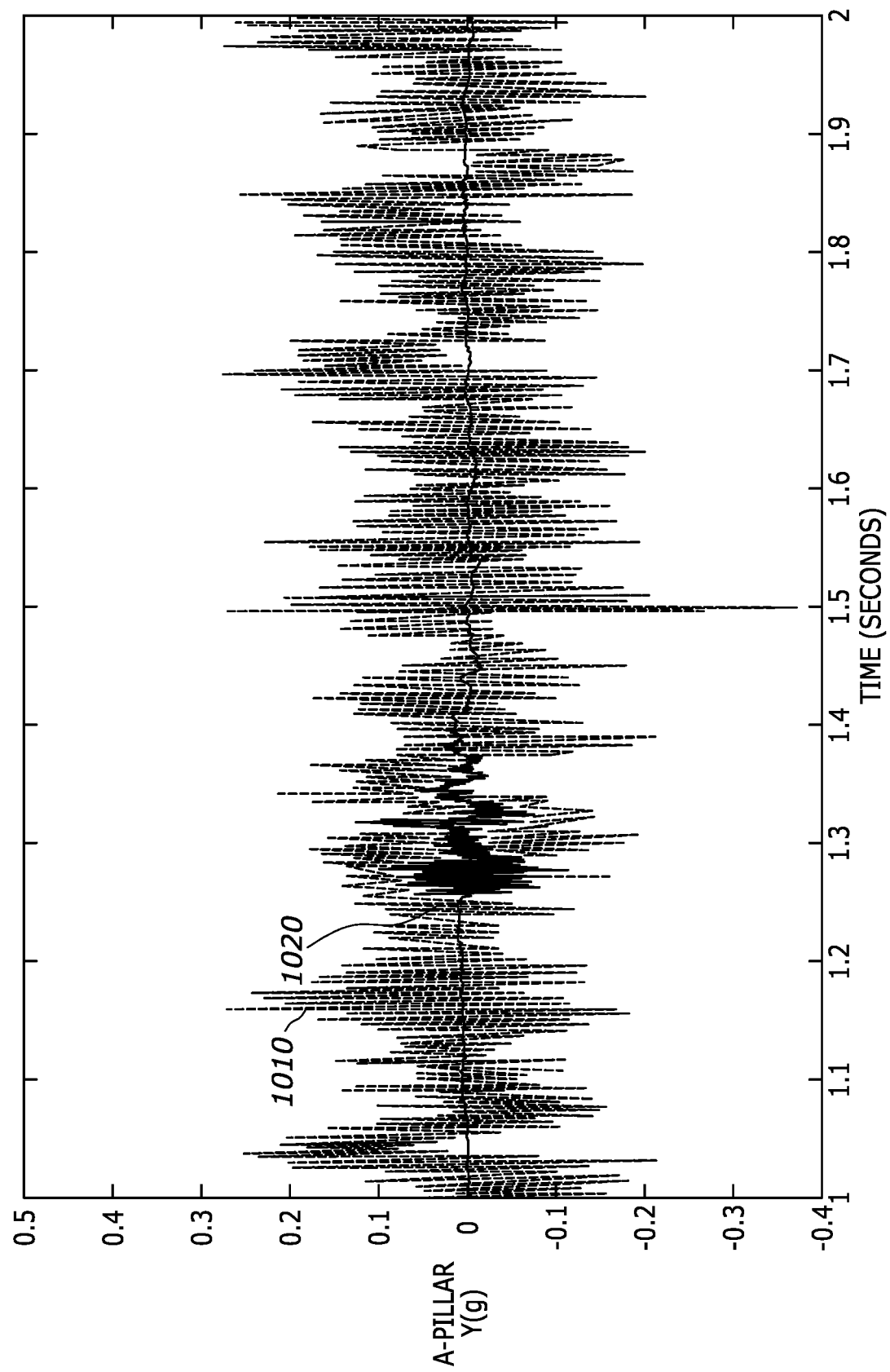
FIG. 10 illustrates external noise versus a low impact audio signal according to one embodiment.
Figure 11:
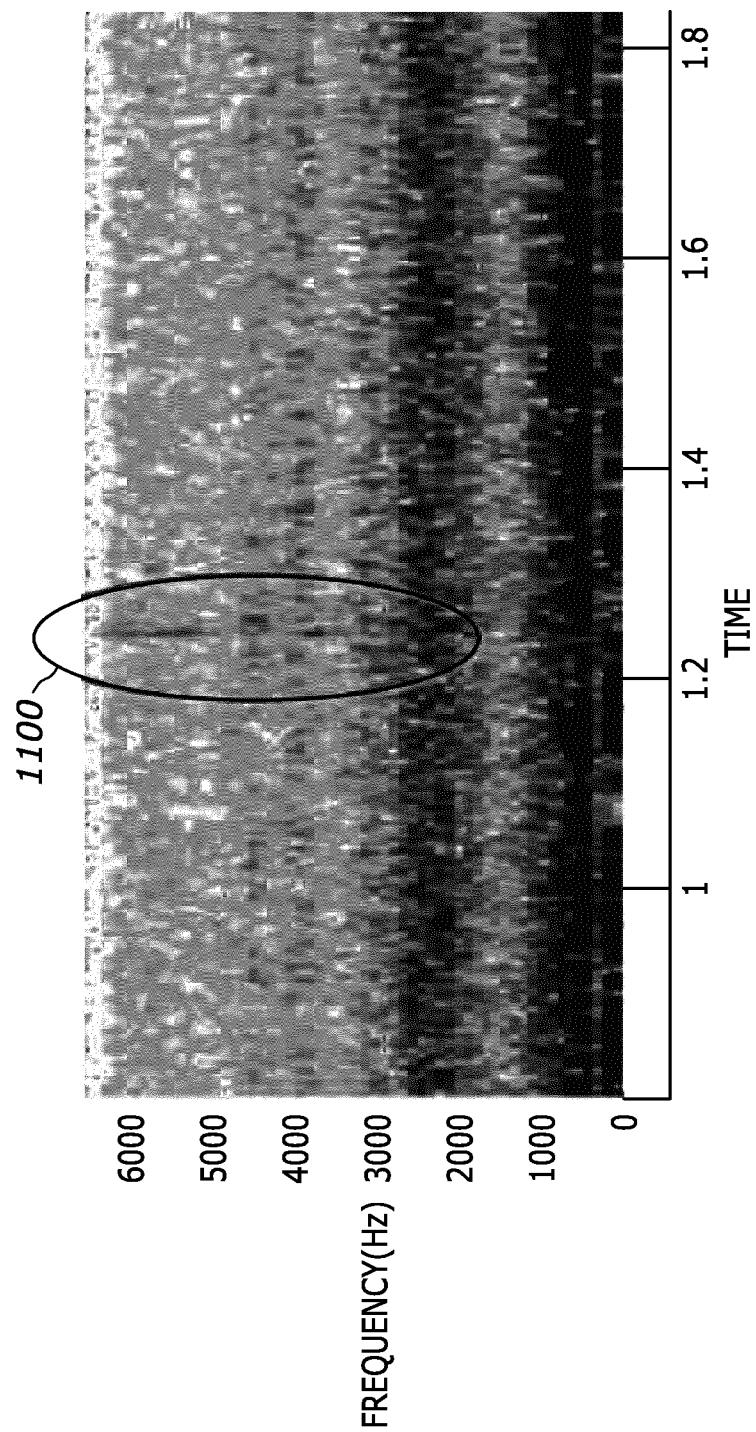
FIG. 11 illustrates detection of a low impact collision amidst external noise according to one embodiment.

Separating real low impact contact from external noise, such as road noise, can be somewhat difficult. However, by comparing the energy within different frequency windows (spectrograms) of the signal, low impact contact can be discerned from external noise. For example, in FIG. 10, the external (observed) noise of a double lane change at 50 miles per hour 1010 is measured by a sensor at the A pillar of the vehicle 105. A low impact collision (2 kilometers per hour) on the side of the vehicle 105 is also measured by the sensor at the A pillar (signal 1020). As shown, by comparing the energy of the different frequency windows, the low impact collision can be detected independent of the external noise. For example, FIG. 11 illustrates an area 1110 where a low impact collision is detected amidst external noise. The spike in frequency amidst the external noise indicates is determined to be the low impact collision by the electronic controller 150.

The following examples illustrate example systems and methods described herein. Example 1: A system for detecting low impact collisions for a vehicle, the system comprising at least one sensor and an electronic controller configured to receive sensor data from the sensor, determine one or more features of the sensor data received from the at least one sensor, determine if a collision has occurred based upon the one or more features of the sensor data, and take at least one action in response to determining that the collision has occurred.

Example 2: the system of example 1, wherein the one or more features of the sensor data include an energy from one or more spectrograms of the sensor data.

Example 3: the system of any of examples 1-2, wherein the at least one sensor is one of a plurality of sensors, and wherein the plurality of sensors includes a plurality of peripheral contact sensors.

Example 4: The system of any of examples 1-3, wherein the at least one sensor is one of a plurality of sensors, and wherein the plurality of sensors includes a plurality of microphones.

Example 5: the system of any of examples 1-4, wherein the electronic controller is configured to determine if the collision has occurred using a machine learning algorithm.

Example 6: the system of any of examples 1-4 and example 5, wherein the machine learning algorithm is a Bayesian classifier with a kernel function.

Example 7: the system of any of examples 1-4 and example 5, wherein the machine learning algorithm is a neural network trained to detect the collision based upon the one or more features of the sensor data.

Example 8: the system of any of examples 1-7, wherein the action is an action selected from the group consisting of outputting an indication of damage to a display and storing the sensor data in a memory Example 9: the system of any of examples 1-7, wherein the vehicle is an autonomous vehicle, and wherein the action is an action selected from the group consisting of transmitting a notification of damage to a remote location via a wireless transceiver and transmitting a command to slow or stop the vehicle to a driving controller of the vehicle.

Example 10: the system of any of examples 1-9, wherein the electronic controller is further configured to filter out unwanted data from the sensor data.

Example 11: a method for detecting low-impact collisions for a vehicle, the method comprising receiving, with an electronic controller, sensor data from at least one sensor, determining, with the electronic controller, one or more features of the sensor data received from the at least one sensor, determining, with the electronic controller, if a collision has occurred based upon the one or more features of the sensor data, and taking, with the electronic controller, at least one action in response to determining that the collision has occurred.

Example 12: the method of example 11, wherein the one or more features of the sensor data include an energy from one or more spectrograms of the sensor data.

Example 13: the method of any of examples 11-12, wherein the at least one sensor is one of a plurality of sensors, and wherein the plurality of sensors includes a plurality of peripheral contact sensors.

Example 14: the method of any of examples example 11-13, wherein the at least one sensor is one of a plurality of sensors, and wherein the plurality of sensors includes a plurality of microphones.

Example 15: the method of any of examples 11-14, further comprising determining, with the electronic controller, if the collision has occurred using a machine learning algorithm.

Example 16: the method of any of examples 11-14 and 15, wherein the machine learning algorithm is a Bayesian classifier with a kernel function.

Example 17: the method of any of examples 11-14 and 15, wherein the machine learning algorithm is a neural network trained to detect the collision based upon the one or more features of the sensor data.

Example 18: the method of any of examples 11-17, wherein the action is an action selected from the group consisting of outputting, with the electronic controller, an indication of damage to a display and storing, with the electronic controller, the sensor data in a memory Example 19: the method of any of examples 11-17, wherein the vehicle is an autonomous vehicle, and wherein the action is an action selected from the group consisting of transmitting, with the electronic controller, a notification of damage to a remote location via a wireless transceiver and transmitting, with the electronic controller, a command to slow or stop the vehicle to a driving controller of the vehicle.

Example 20: the method of any of examples 11-19, wherein further comprising filtering, with the electronic controller, unwanted data from the sensor data.

Thus, embodiments described herein provide, among other things, systems and methods for detecting low-impact collisions for a vehicle.

What is claimed is:

1. A system for detecting low impact collisions for a vehicle, the system comprising:
   at least one sensor, and
   an electronic controller configured to
      receive sensor data from the sensor,
      perform a plausibility step on the sensor data received from the at least one sensor to filter out unwanted data that could be misinterpreted as a low-impact collision to create filtered sensor data,
      determine one or more features of the filtered sensor data, determine if a collision has occurred based upon the one or more features of the filtered sensor data, and take at least one action in response to determining that the collision has occurred.

2. The system of claim 1, wherein the one or more features of the filtered sensor data include an energy from one or more spectrograms of the filtered sensor data.

3. The system of claim 1, wherein the at least one sensor is one of a plurality of sensors, and wherein the plurality of sensors includes a plurality of peripheral contact sensors.

4. The system of claim 1, wherein the at least one sensor is one of a plurality of sensors, and wherein the plurality of sensors includes a plurality of microphones.

5. The system of claim 1, wherein the electronic controller is configured to determine if the collision has occurred using a machine learning algorithm.

6. The system of claim 5, wherein the machine learning algorithm is a Bayesian classifier with a kernel function.

7. The system of claim 5, wherein the machine learning algorithm is a neural network trained to detect the collision based upon the one or more features of the filtered sensor data.

8. The system of claim 1, wherein the action is an action selected from the group consisting of outputting an indication of damage to a display and storing the filtered sensor data in a memory.

9. The system of claim 1, wherein the vehicle is an autonomous vehicle, and wherein the action is an action selected from the group consisting of transmitting a notification of damage to a remote location via a wireless transceiver and transmitting a command to slow or stop the vehicle to a driving controller of the vehicle.

10. A method for detecting low-impact collisions for a vehicle, the method comprising receiving, with an electronic controller, sensor data from at least one sensor, performing, with the electronic controller, a plausibility step on the sensor data received from the at least one sensor to filter out unwanted data that could be misinterpreted as a low-impact collision to create filtered sensor data determining, with the electronic controller, one or more features of the filtered sensor data, determining, with the electronic controller, if a collision has occurred based upon the one or more features of the filtered sensor data, and taking, with the electronic controller, at least one action in response to determining that the collision has occurred.

11. The method of claim 10, wherein the one or more features of the filtered sensor data include an energy from one or more spectrograms of the filtered sensor data.

12. The method of claim 10, wherein the at least one sensor is one of a plurality of sensors, and wherein the plurality of sensors includes a plurality of peripheral contact sensors.

13. The method of claim 10, wherein the at least one sensor is one of a plurality of sensors, and wherein the plurality of sensors includes a plurality of microphones.

14. The method of claim 10, further comprising determining, with the electronic controller, if the collision has occurred using a machine learning algorithm.

15. The method of claim 14, wherein the machine learning algorithm is a Bayesian classifier with a kernel function.

16. The method of claim 14, wherein the machine learning algorithm is a neural network trained to detect the collision based upon the one or more features of the filtered sensor data.

17. The method of claim 10, wherein the action is an action selected from the group consisting of outputting, with the electronic controller, an indication of damage to a display and storing, with the electronic controller, the filtered sensor data in a memory.

18. The method of claim 10, wherein the vehicle is an autonomous vehicle, and wherein the action is an action selected from the group consisting of transmitting, with the electronic controller, a notification of damage to a remote location via a wireless transceiver and transmitting, with the electronic controller, a command to slow or stop the vehicle to a driving controller of the vehicle.

* * * * *